Jan. 31, 1961   A. BOUWERS   2,970,220
SYSTEM FOR OBSERVING OBJECTS UNDER POOR LIGHTING CONDITIONS
Filed July 7, 1958   2 Sheets-Sheet 1

INVENTOR:
Albert BOUWERS
BY:
Wenderoth, Lind & Ponack
Attys

Jan. 31, 1961  A. BOUWERS  2,970,220
SYSTEM FOR OBSERVING OBJECTS UNDER POOR LIGHTING CONDITIONS
Filed July 7, 1958  2 Sheets-Sheet 2

INVENTOR:
Albert BOUWERS
BY: Wenderoth, Lind & Ponack
Attys

United States Patent Office 2,970,220
Patented Jan. 31, 1961

2,970,220

SYSTEM FOR OBSERVING OBJECTS UNDER POOR LIGHTING CONDITIONS

Albert Bouwers, The Hague, Netherlands, assignor to N.V. Optische Industrie "De Oude Delft," Delft, Netherlands Filed July 7, 1958, Ser. No. 746,851

Claims priority, application Netherlands July 8, 1957

3 Claims. (Cl. 250—213)

The invention relates to a system for observing objects under poor lighting conditions and more particularly to a system in which an optical system of large aperture projects an image of the scene onto the light sensitive photo cathode of an electronic brightness intensifier tube.

Night telescopes comprising an optical system and an electronic infra-red image transformer are well known in the art and have found extensive military use for observing objects in foggy weather and during the night. With these systems the objects to be observed must be irradiated by a separate source of infra-red rays. As a rule the image appearing on the fluorescent screen of the image transformer is observed through an eyepiece of such design that the angular magnification of the complete infra-red telescope is substantially equal to unity. Under these conditions an object is observed through the telescope under the same angle as with the naked eye which may be desirable in certain applications, e.g. in the case of a telescope to be used by a car driver when driving his vehicle.

The undesirable fact that in military applications, the necessary infra-red illumination offers to the enemy a possibility of detection has led to attempts to design systems having an analogous arrangement of an optical system and an image tube in which, however, the image tube is provided with a photo sensitive layer which, though it may also be sensitive for available unvisible rays, is particularly sensitive for light rays of the visible spectral range. Such systems thus make use of the natural radiation of the objects to be observed, the image tube in these systems serving as a pure brightness intensifier.

In development work on systems of this kind I have found, that a brightness intensifier tube in combination with an optical system for the purpose of improved perception of details under conditions of poor light and/or low contrast yields particularly useful results if for some of the quantities determining the system definite and coherent values are chosen and if, in particular, the practice is abandoned that the system should have an over-all magnification equal to unity.

According to the invention the optical system for projecting an image of the scene onto the photo cathode of the image tube has an entrance pupil of at least 300 mm. diameter whereas its relative aperture is greater than 1/0.8. Moreover an image tube is used having a linear reduction in size of the image between the photo cathode and the fluorescent screen by a factor of at least 4, the ratio of the focal length of the optical system and the linear reduction of the image tube being at least 5 times the effective diameter of the fluorescent screen of the image tube. When the system is to be used as a telescope for direct visual observation of the scene, a microscope may be added to the system for observing the image on the fluorescent screen of the image tube and according to the invention, the equivalent focal length of such microscope must not exceed 1.5 times the effective diameter of the fluorescent screen, its magnification thus being at least equal to $$\frac{25}{1.5 \times \text{effective diameter fluorescent screen}}$$

It will be understood however that the system according to the invention may also be connected to a photographic or cinematographic camera or to a television pick up tube by means of an intermediate optical system of great luminosity which images the fluorescent screen of the image tube on the film or the light-sensitive plate of the pick-up tube respectively.

The system dimensioned in accordance with the invention has proved to reduced to a marked and surprising degree the angular limit under which details showing a specified contrast with respect to a back-ground of specified brightness can be percepted by the guided or naked eye, whereas its field of view is sufficiently wide for practical purposes and is in the same order as the field angle of standard optical field-glasses. It has been possible with a back-ground brightness of $10^{-5}$ ft. lamb., corresponding substantially to $\frac{1}{1000}$ of the horizon brightness at full moon, to reduce the angular resolving limit for objects of 100% contrast to 0.0005 rad. Under these conditions the naked eye would resolve an angle of 0.012 rad., whereas, as is well-known, a trained observer in normal daylight may reach to an agle in the order of 1' or 0.0003 rad. for 100% contrast objects.

As is well-known the brightness intensification provided by an image tube may be divided into two factors, to wit the intensification due to the reduction in size of the image (geometrical intensification) and that due to the energy picked up from the electro-static field by the electrons travelling from the photo cathode to the fluorescent screen (lumen-intensification). It will be understood that in the system according to the invention it is essential that the geometrical intensification is in the order of 15 times or higher and, as image tubes presently available may produce lumen-intensification factors of 10 to 20 it may be concluded that in the present system both factors are of the same order of magnitude.

It will be understood that in case the brightness of the image produced by the image tube is still less than is desired it is possible to further increase the image brightness by adding an optical system and a second image or eventually a cascade of two or more image tubes, to the system. The optical system then projects an image of the fluorescent screen of the primary image tube onto the photo cathode of the additional one or, in case a cascade of two or more image tubes is provided, between the primary image tube and the first image tube in the cascade, as well as between each pair of subsequent image tubes in the cascade, optical systems of high luminosity are arranged for imaging the fluorescent screen of the foregoing tube on the photo cathode of the next tube in the chain. In each case the over-all reduction in size of the image between the photo-cathode image of the primary tube and the anode screen image of the last tube in the cascade should, in accordance with the invention, exceed the value of 4. In particular it is possible to provide a cascade of optically-coupled image tubes which has an over-all magnification equal to unity, combined with a primary image tube having a reduction factor exceeding said value of 4.

The accompanying drawings show schematically in longitudinal section some systems constructed in accordance with the invention.

Figure 1:
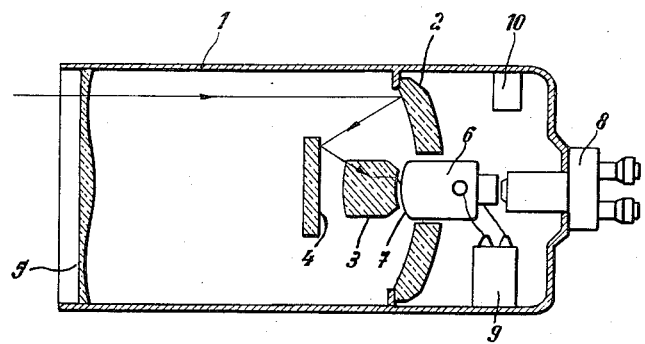
Fig. 1 illustrates a telescope in which only one image tube is used.

In view of the required large aperture diameter of the optical system to be incorporated in the device and in order to keep the weight of the instrument as low as possible a mirror type objective is used in each of the embodiments shown. The objective shown in Fig. 1 consists of a concave spherical reflector 2 mounted in the housing 1, a meniscus-shaped lens 3 correcting part of the spherical aberration of the reflector 2, a Schmidt plate 5 correcting the remainder of the spherical aberration and a plane secondary reflector 4 facing the concave reflector 2. The housing 1 also receives the other components of the system such as a brightness intensifier tube 6, the binocular microscope 8, a source of the high-voltage electrical energy 9 and a drying agent 10. The image tube 6 is mounted in a central aperture of the reflector body 2 and an image of the scene is projected by the plane reflector 4 onto the photo-cathode 7 of the tube 6. The image is reproduced on the fluorescent screen of the tube in a smaller size and with increased brightness. The fluorescent screen is observed through a binocular microscope 8, the equivalent focal length of which does not exceed the diameter of the final image of the brightness intensifier by a factor greater than 1.5.

In accordance with the invention the geometrical data of the illustrated system are as follows:

|  | Mm. |
|---|---|
| Diameter entrance pupil | 450 |
| Focal length objective | 350 |
| Effective diameter photo-cathode | 50 |
| Effective diameter fluorescent screen | 12.5 |
| Focal length microscope | 12.5 |

It will be understood that where in this specification the relative aperture of the optical system is referred to, the ratio between the focal length of the system and the diameter of its entrance pupil is meant as is customary in optics.

Figure 2:
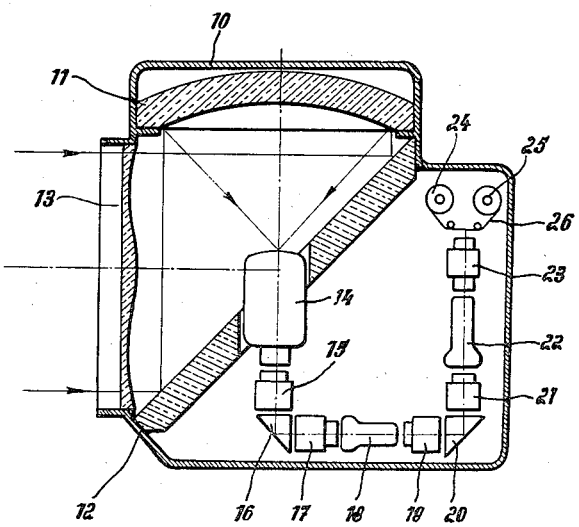
Fig. 2 shows a cinematographic or still camera, in which another type of primary optics is used in combination with a chain of three image tubes.

In Fig. 2 a camera illustrative of the invention is shown in which a chain of three optically coupled image tubes is provided for obtaining the desired degree of image brightness intensification. In this embodiment the several parts of the telescope have been so constructed and arranged as to reduce the over-all dimensions of the instrument to the minimum. To this end a special type of mirror objective is chosen as the primary optical system and the optical axis of the cascade arrangement of image tubes is bent thrice by means of prisms in order to occupy the space behind the primary optical system as fully as possible.

The primary objective of the system occupies the upper left-hand part of the housing 10 and comprises a concave spherical mirror 11, a plane reflector 12 having an angle of 45° with the axis of the spherical mirror 11, and a Schmidt corrector plate 13 substantially at a right angle with the concave mirror. The plane reflector 12 has a central aperture in which a primary image tube 14 is mounted having its axis coinciding with the optical axis of the concave mirror 11. From the drawing it will be clear that light rays entering the system through the corrector plate 13, are reflected by the plane mirror 12 in the direction of the concave mirror 11 and are focussed by the latter in the image receiving surface (photo cathode) of the primary image tube 14. It may be noted that the corrector plate 13 is located in the center of curvature of the concave mirror 11 as reflected by the plane mirror 12.

The chain of image tubes behind the plane mirror 12 comprises in addition to the primary tube 14 and the secondary image tubes 18 and 22 optical systems 15, 16, 19 and 20 as well as right-angle prisms 16 and 20. In the embodiment shown the optical systems 15, 16, 19 and 20 are of similar or equal design. The image screen of tube 14 is in the focal plane of objective 15 so that the light rays in the beams leaving the objective are parallel. Objective 16 focusses these beams after being reflected by the oblique surface of prism 16 on the photo-cathode of the next image tube 18. It will be understood that, as the objectives 15 and 16 have the same focal length, the size of the photo-cathode image of tube 18 is identical to that of the screen image of tube 14. In exactly the same way as described for the objectives 15 and 17, the system consisting of the objective 19, prism 20 and objective 21 images the image screen of the second image tube 18 on the photo-cathode of the third image tube 22, without any reduction or magnification. As the image tubes 18 and 22 have also a magnification factor of unity it is evident that the total reduction in size of the image in the brightness intensifier arrangement 14—22 is identical to the reduction factor of tube 14. In accordance with the invention such reduction should at least equal the value of 4.

The bright final image appearing on the screen of image tube 23 is photographed by means of an objective 23 on a film 26. For the film feed- and tape-up spools 24, 25 are shown, all other conventional appliances for the use of the device as a cinematographic or still camera being omitted from the drawing for clarity.

Figure 3:
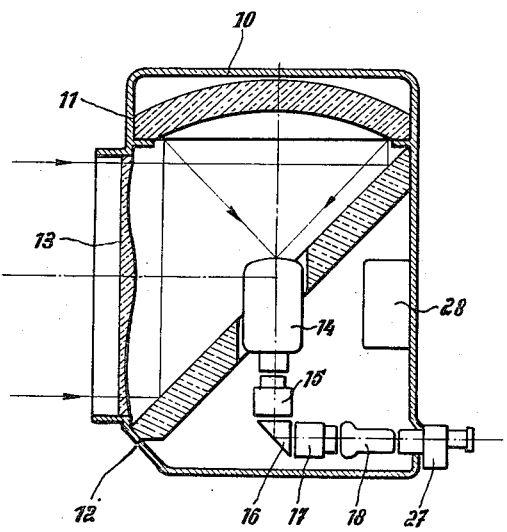
Fig. 3 represents again a telescope having a primary optical system identical to that of Fig. 2 and comprising a set of two images tubes.

The telescope illustrated in Fig. 3 is provided with a primary optical system which is identical to that of the embodiment of Fig. 2, identical parts in both figures being referred to by the same numerals. In Fig. 3, however, only a two stage brightness intensifier arrangement is applied whose parts 14—18 correspond to the parts in Fig. 2 identified by the same reference numerals. For observing the screen image of image tube 18 a magnifier or microscope 27 of arbitrary type is provided. It will be understood that the housing 10 of the telescope shown in Fig. 3 may have external shape substantially of a vertical cylinder or prismatic body whose diameter is determined mainly by the diameter of the concave mirror 11. The brightness intensifier arrangement is completely located in the space left in the housing behind the plane mirror 12 and other parts, such as a source 28 of high-voltage electrical energy may also be accommodated in the cylindrical housing 10. In this way a very compact and easily operable instrument may be obtained. The same holds for the camera of Fig. 2 whose external shape is very similar to that of the telescope of Fig. 3 except for a relatively narrow extension at its rear for accommodating the parts 19—26.

In order to obtain a telescope having an upward direction of view, the optical axis which is deviated 90° in Fig. 3 by the prism 16 may be deviated a still larger angle by substituting a plane mirror or some suitable complex system of plane, reflecting surfaces for the prism 16 and setting this mirror or system to the appropriate angular position with respect to the optical axis. More particularly, the telescope of Fig. 3 may be adapted for vertical scanning facilities by mounting the primary objective of the system and the parts 14 and 15 fixedly associated therewith so as to be rotatable as an entity about an axis perpendicularly intersecting the plane of the optical axis at its deviation point.

The mirror should then be mounted in a manner known as such for rotation about the same axis and in the same sense as the rotatable part of the system but at half the speed of the latter part, in order that the optical axis of the fixed part of the system, including the microscope 27, may have a constant position. In case a more complex system of reflecting surfaces is used instead of the plane mirror as a deviating means similar measures may be taken which readily will present themselves to those skilled in the art.

The numerical data given in connection with the system of Fig. 1 may also be taken for the systems of Figures 2 and 3.

What I claim is:

1. A system for observing scenes under natural illuminating conditions at night comprising in combination a housing, an optical system in said housing having a diameter of the entrance pupil of at least 300 mm. and a relative aperture greater than 1/0.8, a brightness intensifier in optical alignment with said optical system having a primary image receiving surface and a final image reproducing surface, said image receiving surface being in the image surface of said optical system, the linear reduction in size of said final image with respect to said primary image of said brightness intensifier being at least 4, the ratio of the focal length of said optical system and said linear reduction factor being at least 5 times the effective diameter of said final image of said brightness intensifier, a concave spherical mirror whose optical axis is substantially perpendicular to the direction of view, and a plane mirror under an angle with said optical axis and reflecting the rays entering the system in the direction of said concave mirror, said plane mirror having a central aperture receiving a part of said brightness intensifier or giving passage to rays travelling from said concave mirror to said image receiving surface.

2. A telescope system for making visible scenes under poor natural illuminating conditions such as at night, comprising in combination a housing, a first optical system in said housing for collecting radiation from said scene and having a diameter of the entrance pupil of at least 300 mm. and a relative aperture greater than 1/0.8, an electron-optical brightness intensifier in optical alignment with said first optical system and having a primary image receiving surface and a final image reproducing surface, said image receiving surface being in the focal surface of said first optical system, the linear reduction in size of the image on said final image reproducing surface with respect to the image on said primary image reproducing surface being at least equal to 4, and the ratio of the focal length of said first optical system and said linear reduction in size being at least 5 times the effective diameter of the image on said final image reproducing surface, and a magnifying second optical system for observing the image on said final image reproducing surface, said second optical system having an equivalent focal length which is less than 1.5 times the effective diameter of the image on said final image reproducing surface.

3. A telescope system as in claim 2 wherein said electron-optical brightness intensifier comprises at least two brightness intensifier tubes arranged in series relation and each having a photocathode and a fluorescent screen, the photocathode of a first one of said tubes being in the focal surface of said first optical system and the fluorescent screen of a last one of said tubes being in the focal surface of said second optical system, further optical systems being arranged between subsequent tubes in said series for projecting an image of the fluorescent screen of the foregoing tube onto the photocathode of the next tube.

References Cited in the file of this patent

UNITED STATES PATENTS 2,825,815   Dis Ario _____ Mar. 4, 1958